Figure 1:
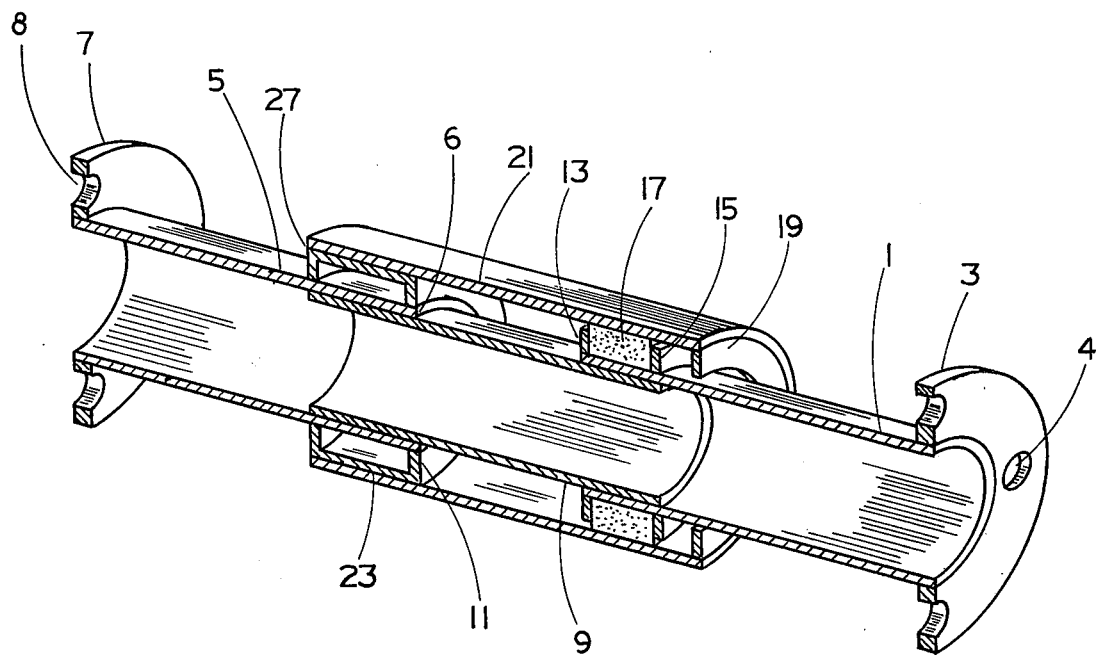

United States Patent [19]

Kniss, Jr. et al.

[11] 4,030,740

[45] June 21, 1977

[54] EXPANSION JOINT

[75] Inventors: Edward L. Kniss, Jr.; Dennis L. Hixenbaugh, both of Louisville, Ky.; Jerry A. Maudlin, Perkin; Nicholas J. Brozenick, Clarksville, both of Ind.

[73] Assignee: American Air Filter Company, Inc., Louisville, Ky.

[22] Filed: July 1, 1975

[21] Appl. No.: 592,122

[52] U.S. Cl. .................................. 285/16; 285/302
[51] Int. Cl.² ......................................... F16L 55/00
[58] Field of Search ............ 285/302, 31, 347, 337, 285/16, 301, 298, 299, 300, 347

[56] References Cited

UNITED STATES PATENTS

| | | | |
|---|---|---|---|
| 1,001,842 | 8/1911 | Greenfield | 285/347 X |
| 1,363,974 | 12/1920 | Heylman | 285/302 |
| 2,438,312 | 3/1948 | Bunn et al. | 285/302 X |
| 2,565,296 | 8/1951 | Chyle | 285/301 X |
| 2,845,283 | 7/1958 | Kuhn | 285/302 X |
| 2,911,238 | 11/1959 | Myers et al. | 285/301 X |
| 3,006,665 | 10/1961 | Harris | 285/302 |
| 3,427,051 | 2/1969 | White et al. | 285/302 X |
| 3,876,252 | 4/1975 | Cilles | 285/302 |

Primary Examiner—Dave W. Arola

[57] ABSTRACT

An expansion joint for two ducts having incorporated therein means for enabling movement of one of the ducts relative to the other and further including means for preventing substantial lateral movement of the ducts including first and second opposed cylindrical conduits, the first of the opposed conduits being slidably mounted onto an inner sleeve with an outer sleeve extending substantially around and in sliding relation with the first conduit.

8 Claims, 2 Drawing Figures

EXPANSION JOINT

BACKGROUND OF THE INVENTION

This invention relates to an expansion joint for connecting a first duct to a second axially aligned duct and more particularly relates to an expansion joint with means where one duct can move relative to a second duct and having incorporated therein means for preventing substantial lateral movement of the first duct in relation to the second duct.

In many operations utilizing fluid flow lines, the lines tend to expand and contract during these operations either in view of a change of pressure within the fluid being transported through the lines or because of a change in the temperature of the flowing fluid. In order to compensate for the expansion and contraction of these lines, expansion joints have been disposed at selected points along the lines in order to allow for the expansion and contraction while still maintaining fluid tight seals at these expansion and contraction points. In many instances the expansion joints include bellows in order to allow one pipe to move laterally in relation to a second pipe. Also, other connections including rubber sleeves have been adapted to fit closely to and surround pipe ends to be connected thereto thereby allowing for expansion and contraction of the pipe connections. In the utilization of rubber seals and comparable materials, a fluid tight seal has been difficult to obtain and rubber or other flexible materials have not stood up upon increasing and decreasing the temperature and pressure of the fluids flowing therethrough. Other expansion joints which allow for the lateral movement of one pipe or duct in relation to a second pipe or duct have been suggested but in most instances fluid tight seals under continued use have also been very difficult to obtain.

SUMMARY OF THE INVENTION

In the present invention, it is recognized that it is desirable to provide improved means for connecting a first duct to a second duct wherein the first duct can move laterally in relation to the second duct. It is further recognized that it is desirable to provide means for connecting a first duct to a second duct wherein the first duct can move laterally in relation to the second duct only a preselected distance. Also, it is recognized that it is desirable to provide an improved means for connecting a first duct to a second duct wherein the first duct can move laterally relative to the second duct while maintaining a substantially fluid tight seal. Even further, it is recognized that it is desirable to provide a joint that will accommodate refractory lining for ultra-high temperature operations and will without refractory handle temperatures in excess of rubber or fabric type joints.

The present invention advantageously provides a straightforward arrangement for an expansion joint wherein one duct may move laterally in relation to a second duct a preselected distance upon expansion and contraction of one of the duct members. The present invention further provides an expansion joint enabling one duct to move laterally in relation to a second duct while maintaining a fluid tight seal.

Various other features of the present invention will become obvious to those skilled in the art upon reading the disclosure set forth hereinafter.

More particularly, the present invention provides an expansion joint for two ducts comprising: first and second opposed conduits, at least the first conduit being slidably mounted onto an inner sleeve disposed therebetween; and, the opposed conduits having outwardly extending receiving means for receiving an outer sleeve extending around the ends thereof, at least the first conduit being in sliding relation with the outer sleeve.

It is to be understood that the description of the examples of the present invention given hereinafter are not by way of limitation. Various modifications within the scope of the present invention will occur to those skilled in the art upon reading the disclosure set forth hereinafter.

Figure 2:
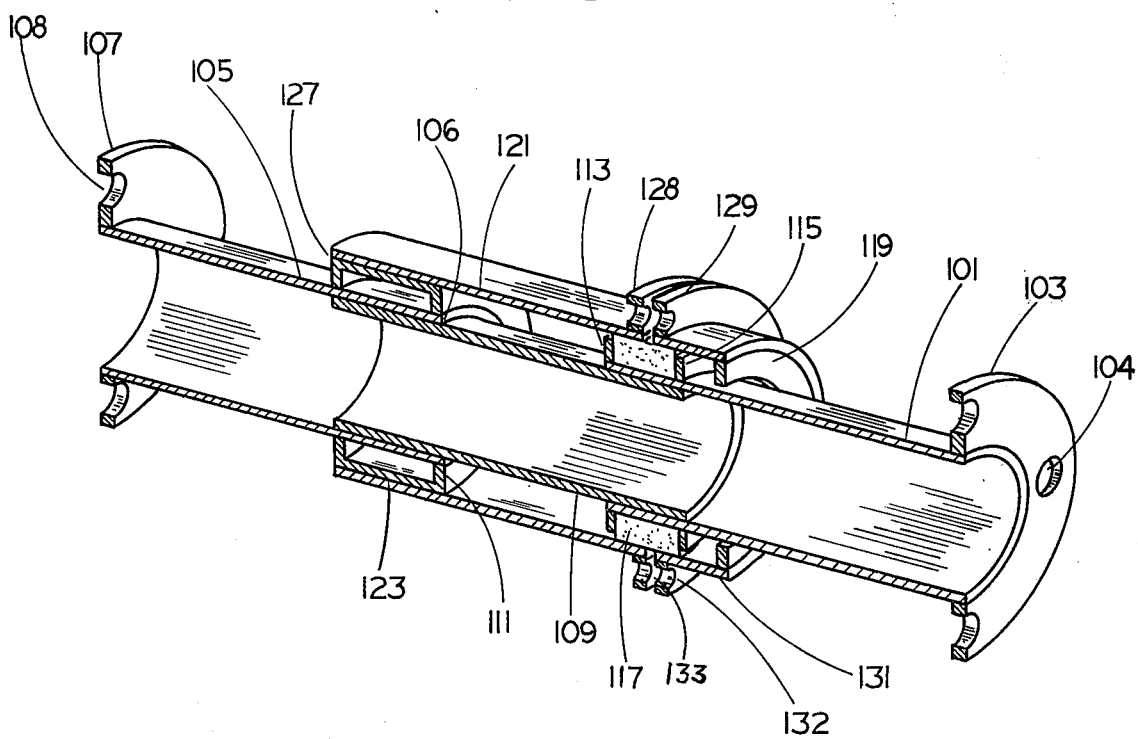

Referring to the drawing:

FIG. 1 is a perspective view, in cutaway, of one preferred expansion joint of the present invention; and, FIG. 2 is a perspective view, in cutaway, of another preferred expansion joint of the present invention.

In FIG. 1, an expansion joint for joining two ducts shows one preferred embodiment of the present invention. The expansion joint includes first and second opposed cylindrical conduits 1 and 5, respectively, the first conduit 1 being slidably mounted onto an inner sleeve 9 disposed therebetween. The second conduit 5 is affixed to the sleeve 9 by welding at the position noted by the numeral 6. First and second opposed conduits 1 and 5 are provided with flange members 3 and 7, respectively, at their outer ends for coupling with mating flanges attached to flow through ducts (not shown). Flange members 3 and 7 may be attached by any known means to conduits 1 and 5 but are generally welded thereto in a fluid tight relation. Flanges 3 and 7 include apertures 4 and 8 therein, respectively, for coupling with mating flanges of the attached flow through conduits (not shown).

Sleeve 9 generally has an outer diameter substantially equal to the inner diameter of the conduits 1 and 5 thereby providing a sliding relationship of the conduit 1 with the sleeve 9.

The conduit 5 at the end opposed to the end containing the flange member 7 includes a U-shaped section receiving member 11 encircling conduit 5 and affixed thereto for receiving an outer sleeve 21 thereon, the U-shaped receiving member 11 including a base portion 23 which supports the sleeve 21 and is affixed thereto by welding at the position noted by the numeral 27. The outer diameter of the circular U-shaped cross section receiving member 11 is substantially equal to the inside diameter of the sleeve 21. It is realized that other receiving members may be utilized for receiving the sleeve 21 thereon but a U-shaped receiving member has been preferred as the circular U-shaped receiving member including a base 23 provides added support for the sleeve 21.

The conduit 1 includes a pair of spaced ring members 13 and 15 fixedly attached thereon at the end of the conduit opposed to the flange member 3. Disposed between the ring members 13 and 15 is a flexible gasket material 17 which is packed sufficiently tight between the ring members 13 and 15 so as to communicate and support in sliding relation thereon sleeve 21, sleeve 21 being disposed in fluid tight relation with the conduit 1. The ring members 13 and 15 have outer diameters less than the inner diameter of the sleeve 21 to give a preselected spacing between the outer periphery of the ring members 13 and 15 and the sleeve 21 thereby providing for transverse movement between conduit 1 and sleeve 21 upon expansion and contraction as well as the lateral movement thereof in relation to movement of the conduits 1 and 5 upon expansion and contraction of the conduit members (not shown) to which they are attached.

Sleeve 21 is also provided with a ring shaped stop member 19 fixedly attached at one end thereof to regulate lateral movement of the expansion joint during expansion and contraction. The ring member 19 has an inner diameter greater than the outer diameter of the conduit 1 thereby providing for a spacing between the ring member 19 and the conduit 1 to allow transverse movement of the sleeve 21 as noted previously, ring 19 being spaced from ring member 15 in a contracted or first position and in juxtaposed relation in an expanded or second position.

In FIG. 2, an expansion joint for joining two ducts illustrates another preferred embodiment of the present invention. The expansion joint includes first and second opposed cylindrical conduits 101 and 105 respectively, the first conduit 101 being slidably mounted onto an inner sleeve 109 disposed therebetween. The second conduit 105 is affixed to the sleeve 109 by welding at the position noted by the numeral 106. First and second opposed conduits 101 and 105 are provided with flange members 103 and 107, respectively, at their outer ends for coupling with mating flanges attached to flow through ducts (not shown). Flange members 103 and 107 may be attached by any known means to conduits 101 and 105 but are generally welded thereto in a fluid tight relation. Flanges 103 and 107 include apertures 104 and 108 therein, respectively, for coupling with mating flanges of attached flow through conduits (not shown).

Sleeve 109 generally has an outer diameter substantially equal to the inner diameter of the conduits 101 and 105 thereby providing a sliding relationship of the conduit 101 with the sleeve 109.

The conduit 105 at the end opposed to the end containing the flange member 107 includes a U-shaped section receiving member 111 encircling conduit 105 and fixedly attached thereto for receiving an outer sleeve 121 thereon, the U-shaped receiving member 111 including a base portion 123 which supports the sleeve 121 and is affixed thereto by welding at the position noted by the numeral 127. The outer diameter of the circular U-shaped cross section receiving member 111 is substantially equal to the inside diameter of the sleeve 121. It is realized that other receiving members may be utilized for receiving the sleeve 121 thereon but a U-shaped receiving member has been preferred as the circular U-shaped receiving member including a base 123 provides added support for the sleeve 121.

A sleeve 131 is provided with a ring-shaped stop member 119 fixedly attached at one end thereof to regulate lateral movement of the expansion joint during expansion and contraction and a flange member 129 fixedly attached at the opposed end thereof. The sleeve 121 is provided with a flange member 128 fixedly attached at one end thereof for coupling with flange 129 of sleeve 131. An aperture 132 is provided in flange 129 for mating with an axially aligned aperture 133 in flange 128 for coupling flange 129 to flange 128.

The ring member 119 has an inner diameter greater than the outer diameter of the conduit 101 thereby providing for a spacing between the ring member 119 and the conduit 101 to allow transverse movement of the sleeves 121 and 131, ring 119 being spaced from ring member 115 in a contracted or first position and in juxtaposed relation in an expanded or second position.

The conduit 101 includes a pair of spaced ring members 113 and 115 fixedly attached thereon at the end of the conduit opposed to the flange member 103. Disposed between the ring members 113 and 115 is a flexible gasket material 117 which is packed sufficiently tight between the ring members 113 and 115 so as to communicate and support in sliding relation thereon sleeves 121 and 131, sleeves 121 and 131 being disposed in fluid tight relation with the conduit 101. The ring members 113 and 115 have outer diameters less than the inner diameter of the sleeves 121 and 131 to give a preselected spacing between the outer periphery of the ring members 113 and 115 and the sleeves 121 and 131 thereby providing for transverse movement between conduit 101 and sleeves 121 and 131 upon expansion and contraction as well as the lateral movement thereof in relation to movement of the conduits 101 and 105 upon expansion and conraction of the conduit members (not shown) to which they are attached. Furthermore, sleeve member 131 may be disconnected from sleeve member 121 and indepndently slid toward flange member 103 thereby enabling easy removal and replacement of the flexible gasket material 117. The aforemenionted permits repacking of gasket 117 while maintaining the expansion joint in operation.

Thus, it will be realized that various changes may be made to the specific embodiment shown and described without departing from the scope and spirit of the present invention.

What is claimed is:

1. An expansion joint for two ducts compising: first and second opposed conduits mounted onto an inner sleeve, said first conduit being slidably mounted onto said inner sleeve and said second conduit including means affixing said second conduit to said inner sleeve; and, said opposed conduits having outwardly extending receiving means on facing ends with an outer sleeve extending around said ends thereof, the outwardly extending means of the first conduit includes a flexible packing material therein sealingly engaging said first conduit and said outer sleeve, said first conduit being in sliding relation with said outer sleeve, said second conduit including means affixed against movement relative to said outer sleeve, said outer sleeve being in two sections, a first section and a second section, said first and second sections having opposed facing flanges thereon, said facing flanges including connecting means whereby said packing material may be removed and replaced.

2. The expansion joint of claim 1 wherein said first conduit receiving means including said flexible packing therein includes two spaced ring members, said flexible packing being disposed between said ring members.

3. The expansion joint of claim 2 wherein the outer diameter of said ring members are less than the inner diameter of said outer sleeve, said flexible packing material extending outwardly beyond said ring members.

4. The expansion joint of claim 1 including flange means on opposed outwardly extending ends of said opposed conduits.

5. The expansion joint of claim 1, said outer sleeve being provided with an inwardly extending ring member thereon at one end thereof, said ring member being spaced from said outwardly extending receiving means of said first conduit in one position and in juxtaposed relation therewith upon expansion to a second position.

6. The expansion joint of claim 5 wherein said ring member has an inner diameter greater than the outer diameter of said first conduit.

7. The expansion joint of claim 1 wherein said opposed conduits are of approximately the same inner diameter.

8. The expansion joint of claim 1 wherein the receiving means of said first conduit is of U-shaped cross section encircling said conduit, the base of said U-shaped cross section being in communication with said outer sleeve.

* * * * *